United States Patent
Yoo et al.

(10) Patent No.: US 12,002,162 B2
(45) Date of Patent: Jun. 4, 2024

(54) METHOD AND APPARATUS FOR PROVIDING VIRTUAL CONTENTS IN VIRTUAL SPACE BASED ON COMMON COORDINATE SYSTEM

(71) Applicant: KOREA INSTITUTE OF SCIENCE AND TECHNOLOGY, Seoul (KR)

(72) Inventors: Byoung Hyun Yoo, Seoul (KR); Yong Jae Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 192 days.

(21) Appl. No.: 17/607,402

(22) PCT Filed: Jul. 27, 2020

(86) PCT No.: PCT/KR2020/009852
§ 371 (c)(1),
(2) Date: Oct. 29, 2021

(87) PCT Pub. No.: WO2021/029566
PCT Pub. Date: Feb. 18, 2021

(65) Prior Publication Data
US 2022/0207832 A1    Jun. 30, 2022

(30) Foreign Application Priority Data
Aug. 14, 2019    (KR) .................. 10-2019-0099263

(51) Int. Cl.
*G06T 19/00*    (2011.01)
*G06T 7/73*    (2017.01)
(Continued)

(52) U.S. Cl.
CPC .............. *G06T 19/003* (2013.01); *G06T 7/74* (2017.01); *G06V 10/24* (2022.01);
(Continued)

(58) Field of Classification Search
CPC ................ G06T 19/003; G06T 7/74; G06T 2207/30208; G06T 2207/30204;
(Continued)

(56) References Cited

U.S. PATENT DOCUMENTS 8,823,697 B2    9/2014    Woo et al.
9,767,574 B2 *  9/2017    Menozzi ................ G06F 11/00
(Continued)

FOREIGN PATENT DOCUMENTS

KR          10-0963238 B1    6/2010
KR     10-2018-0070431 A     6/2018
KR     10-2019-0053119 A     5/2019

OTHER PUBLICATIONS

Liu et al., Real Time Tracking Method by Using Color Markers, 2013 (Year: 2013).*
(Continued)

*Primary Examiner* — Phong X Nguyen
(74) *Attorney, Agent, or Firm* — CANTOR COLBURN LLP

(57) ABSTRACT

A method for providing virtual contents in a virtual space based on a common coordinate system includes: detecting a base marker for identifying a fixed point of an actual operation space, and a target marker for identifying an actual operation object, from initial image data indicating an initial state of the actual operation object in the actual operation space; calculating an initial model matrix of a target marker expressing an initial position and orientation of the target marker, and a model matrix of the base marker expressing a position and an orientation of the detected base marker in a virtual operation space having a common coordinate system which has the detected base marker as a reference; and calculating a current model matrix of the target marker expressing a current position and orientation of the target (Continued)

marker by using the calculated model matrix of the base marker.

11 Claims, 10 Drawing Sheets

(51) Int. Cl.
  *G06V 10/24* (2022.01)
  *G06V 10/75* (2022.01)
  *G06V 20/64* (2022.01)
(52) U.S. Cl.
  CPC ........ *G06V 10/7553* (2022.01); *G06V 20/653* (2022.01); *G06T 2207/30208* (2013.01)
(58) Field of Classification Search
  CPC ..... G06T 17/00; G06T 2219/024; G06T 7/11; G06T 7/73; G06T 19/006; G06T 7/75; G06T 19/20; G06V 10/24; G06V 10/7553; G06V 20/653; G06V 10/225; G06F 3/011
  See application file for complete search history.

(56) References Cited

U.S. PATENT DOCUMENTS

| | | | |
|---|---|---|---|
| 10,403,047 B1* | 9/2019 | Comer | G06F 3/011 |
| 10,482,677 B1* | 11/2019 | Iyer | G06F 17/16 |
| 10,573,089 B2 | 2/2020 | Davies et al. | |
| 10,636,172 B1* | 4/2020 | Islam | G06T 7/60 |
| 10,839,557 B1* | 11/2020 | Arora | G06T 19/006 |
| 11,842,455 B1* | 12/2023 | Baughman | G06N 10/00 |
| 2010/0287485 A1* | 11/2010 | Bertolami | G06F 3/011 715/764 |
| 2010/0315418 A1* | 12/2010 | Woo | G06F 3/04815 345/419 |
| 2012/0075424 A1* | 3/2012 | Kawamoto | H04N 13/239 348/46 |
| 2014/0118339 A1* | 5/2014 | Davies | G06T 7/80 345/419 |
| 2016/0225188 A1* | 8/2016 | Ruddell | G06T 19/006 |
| 2016/0292889 A1* | 10/2016 | Niwayama | G06T 7/75 |
| 2016/0350973 A1* | 12/2016 | Shapira | G06F 3/011 |
| 2018/0339223 A1* | 11/2018 | Haas | G06T 19/006 |
| 2019/0066314 A1* | 2/2019 | Abhari | G06T 7/33 |
| 2019/0156086 A1* | 5/2019 | Plummer | G06T 7/248 |
| 2019/0180134 A1* | 6/2019 | Myeong | G06T 7/74 |
| 2019/0272674 A1* | 9/2019 | Comer | G06F 3/04815 |
| 2019/0380792 A1* | 12/2019 | Poltaretskyi | A61B 34/10 |
| 2020/0058169 A1* | 2/2020 | Friesenhahn | G06T 19/006 |
| 2020/0129136 A1* | 4/2020 | Harding | G06F 3/011 |
| 2020/0321099 A1* | 10/2020 | Holladay | G16H 30/40 |
| 2020/0357188 A1* | 11/2020 | Kurabayashi | G06V 20/20 |
| 2021/0142508 A1* | 5/2021 | Azimi | G02B 27/017 |
| 2021/0333797 A1* | 10/2021 | Yu | G01C 21/3644 |
| 2022/0107681 A1* | 4/2022 | Ronnau | G06T 19/20 |
| 2022/0292796 A1* | 9/2022 | Xu | G06T 19/006 |
| 2022/0398427 A1* | 12/2022 | Scanlon | G06T 19/20 |
| 2023/0046226 A1* | 2/2023 | Sasaki | G06T 7/70 |
| 2023/0088922 A1* | 3/2023 | De Bruijn | G06F 3/165 |
| 2023/0095339 A1* | 3/2023 | Cleland-Huang | H04L 65/612 345/419 |
| 2023/0119646 A1* | 4/2023 | Zhou | G06T 19/006 345/157 |
| 2023/0290266 A1* | 9/2023 | Jia | H04L 65/612 |
| 2023/0316664 A1* | 10/2023 | Suryawanshi | G06V 10/7747 |

OTHER PUBLICATIONS

Han et al., Online Optical Marker-based Hand Tracking with Deep Labels, 2018 (Year: 2018).*
Peer, Vive Tracking Alignment and Correction Made Easy, 2018 (Year: 2018).*
Korean Office Action for KR Application No. 10-2019-0099263 mailed on Jul. 10, 2020.
International Search Report mailed Oct. 15, 2020 for PCT/KR2020/009852.

* cited by examiner

FIG. 6
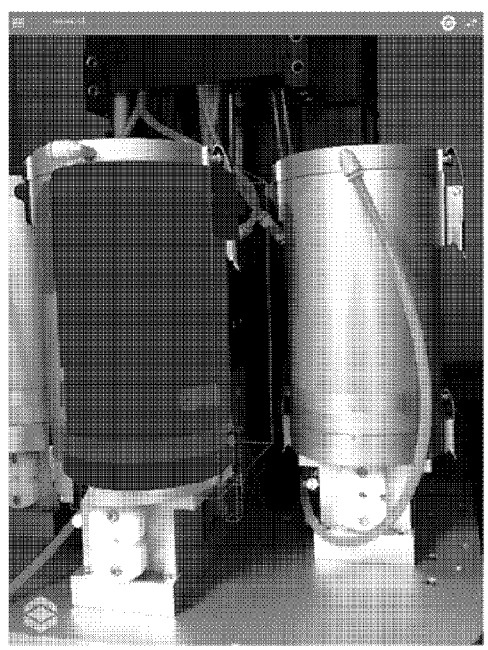
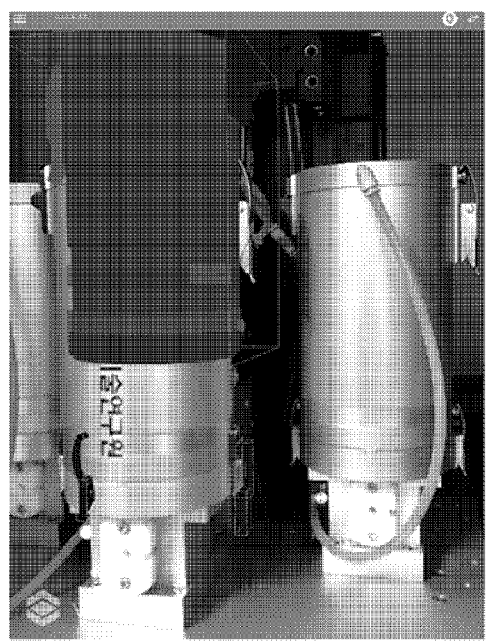
(a)                    (b)

FIG. 9
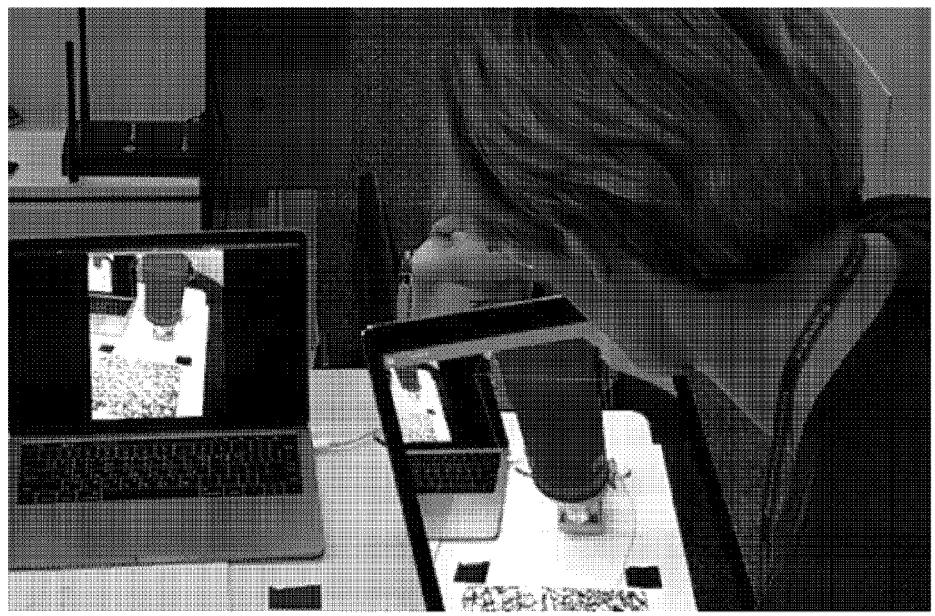
(a)
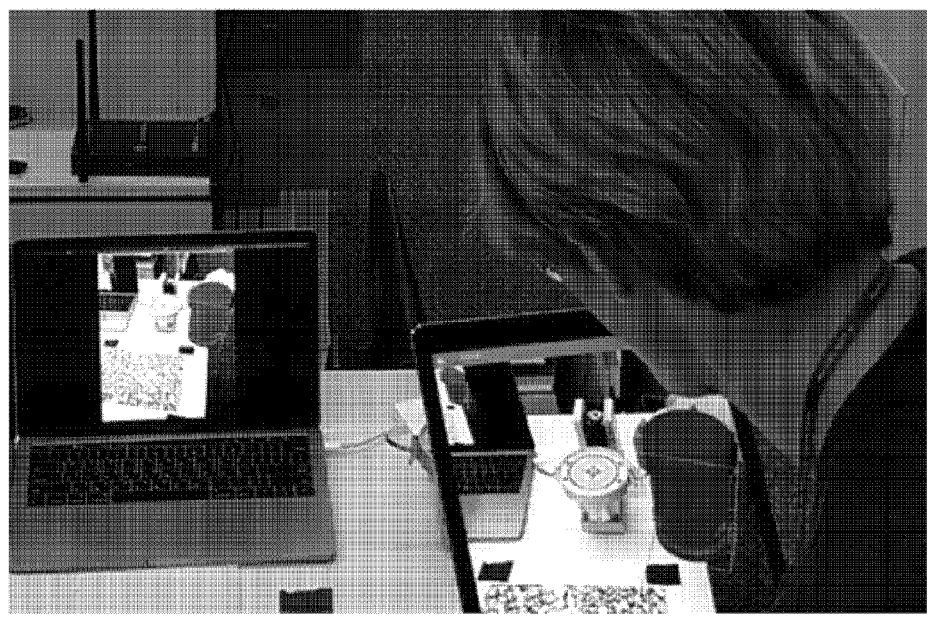
(b)

FIG. 10
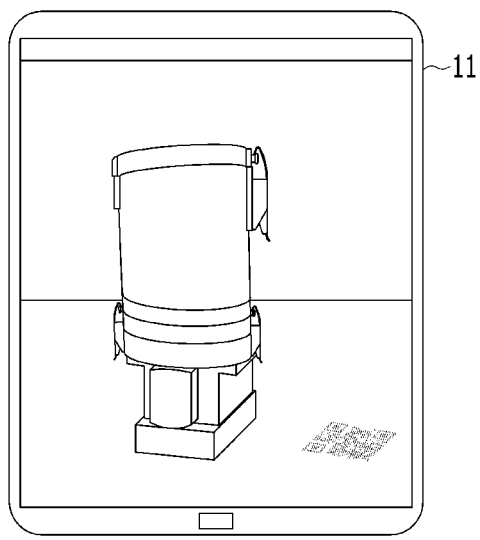
(a)
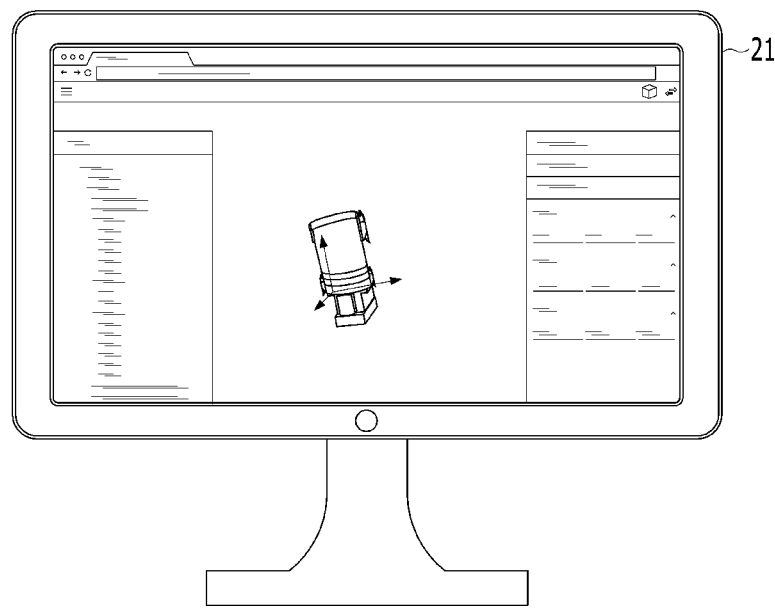
(b)

METHOD AND APPARATUS FOR PROVIDING VIRTUAL CONTENTS IN VIRTUAL SPACE BASED ON COMMON COORDINATE SYSTEM

TECHNICAL FIELD

The present invention relates to a method for providing virtual contents in a virtual space, and more particularly, to a method for providing virtual contents in a virtual space based on a common coordinate system based on using a base marker as a reference.

BACKGROUND

A virtual space refers to a three-dimensional virtual space mirroring a part or all of a real space. The virtual space includes virtual object and space that are not real generated by a computer or the like. Such a virtual space provides a corresponding space to a user through augmented reality (AR) technology, virtual reality (VR) technology, or mixed reality technology. Such a virtual space has recently been used in various fields such as a game, aviation, and military. A representative example of using the virtual space is remote cooperation.

The remote cooperation means that multiple operators located in remote places physically distant from each other communicate with each other and solve the same work together. In other words, the remote cooperation means that multiple operation participants do not gather in the same space and perform an operation while sharing information in different spaces. Such remote cooperation can solve a spatial constraint that all operation participants must gather in the same space.

In such remote cooperation, the operation participants are connected to each other through a network and share the same screen. An example of the remote cooperation is a video conference or sharing of the same screen so that remote operation participants located in remote places can solve the same operation together. In the past, the remote cooperation was a method in which the operation participants communicated and collaborated through voice, chatting, or the like. Recent remote cooperation uses augmented reality, virtual reality, or mixed reality to provide more information than that in the past, thereby providing a cooperative space shared by the operation participants of the remote cooperation. The cooperative space, to which the augmented reality, the virtual reality, or the mixed reality is applied, is a virtual space mirroring part or all of the real space in which a real cooperation object exists. This virtual cooperative space is provided to the operation participants and the operation participants can perform a collaboration on the virtual cooperative space.

In such remote cooperation service, when any one of a plurality of operation participants performs an arbitrary operation on the virtual cooperative space, the operation performed by any one operation participant is mirrored on the virtual cooperative space and is transmitted to all operation participants. Here, in a case where a coordinate system and a scale on the virtual cooperative space are not unified among the plurality of operation participants, there is a problem in that the operation performed by any one operation participant is not accurately mirrored on the virtual cooperative space. In an example in which the virtual cooperation object is moved on the virtual cooperative space by any one of the operation participants, if the coordinate scales among the operation participants are different from each other, an accurate movement distance of the cooperation object cannot be known to other operation participants even if the cooperation object is moved by any one of the operation participants. In addition, in the above example, if the coordinate systems of the virtual cooperative spaces do not match each other, other operation participants cannot know a moving direction of the cooperation object even if the cooperation object is moved by any one of the operation participants.

As described above, since the coordinate system and scale are not unified on the virtual cooperative space of the remote cooperation system, accurate information on the operation of the operation participant cannot be provided to other operation participants. Accordingly, there is a problem that smooth cooperation among the plurality of operation participants is hindered on the virtual cooperative space.

In the conventional remote cooperation system, in order to solve such a problem, in a case where the coordinate systems and scales do not match each other among the operation participants, a method is used in which each of the operation participants adjusts the coordinate system and scale of the virtual cooperative space in his/her device, thereby matching the coordinate systems and scales each other among the operation participants. However, in this conventional method, since each of the multiple operation participants manually adjusts the coordinate system and scale of the virtual cooperative space in his/her device, there is a problem that the coordinate systems and scales of all the operation participants cannot be perfectly matched each other.

SUMMARY OF INVENTION

Technical Problem

An object of the present invention is to provide a method for providing virtual contents in a virtual space based on a common coordinate system. In addition, the problem is not limited to the technical problems as described above, and another technical problem may be derived from the following description.

Solution to Problem

A method for providing virtual contents in a virtual space based on a common coordinate system according to an aspect of the present invention, the method includes: a step of detecting a base marker, which is a marker for identifying a fixed point of an actual operation space, and a target marker, which is a marker for identifying an actual operation object, from initial image data indicating an initial state of the actual operation object in the actual operation space; a step of calculating an initial model matrix of a target marker expressing an initial position and orientation of the target marker, and a model matrix of the base marker expressing a position and an orientation of the detected base marker in a virtual operation space having a common coordinate system which uses the detected base marker as a reference; and a step of calculating a current model matrix of the target marker expressing a current position and orientation of the target marker by using the calculated model matrix of the base marker.

In the step of detecting the target marker, a shape included in the initial image data is extracted, and the base marker and the target marker are detected by using the extracted shape.

In the step of detecting the target marker, the extracted shape is compared with a shape of the base marker and a shape of the target marker, a shape matching the shape of the base marker is detected as the base marker, and a shape matching the shape of the target marker is detected as the target marker.

The step of calculating the model matrix of the base marker includes: a step of calculating an initial model view matrix of the base marker indicating the position and the orientation of the base marker using as a reference a view of a camera module used for photographing the initial image data based on the initial image data, and an initial model view matrix of the target marker indicating the position and the orientation of the target marker as a reference the view of the camera module; a step of calculating an initial model matrix of the target marker on the virtual cooperative space; and a step of calculating a model matrix of the base marker by using the calculated initial model view matrix of the base marker, the calculated initial model matrix of the target marker, and the calculated initial model view matrix of the target marker.

In the step of calculating the model matrix of the base marker by using the calculated initial model view matrix of the base marker, the calculated initial model matrix of the target marker, and the calculated initial model view matrix of the target marker, the model matrix of the base marker is calculated according to the following equation.

$$M_b \text{ matrix} = M_o \text{ matrix} * (MV_o \text{ matrix})^{-1} * MV_b \text{ matrix} \quad \text{<Equation>}$$

($M_b$ matrix: model matrix of base marker, $MV_b$ matrix: initial model view matrix of base marker, $M_o$ matrix: initial model matrix of target marker, $MV_o$ matrix: initial model view matrix of target marker)

The step of calculating the current model matrix of the target marker includes: a step of calculating a current model view matrix of the base marker and a current model view matrix of the target marker based on the current image data; and a step of calculating a current model matrix of the target marker by using the calculated current model view matrix of the base marker, the calculated current model view matrix of the target marker, and the calculated model matrix of the base marker.

In the step of calculating the current model matrix of the target marker by using the calculated current model view matrix of the base marker, the calculated current model view matrix of the target marker, and the calculated model matrix of the base marker, the current model matrix of the target marker is calculated according to the following equation.

$$M_o' \text{ matrix} = M_b \text{ matrix} * (MV_b' \text{ matrix})^{-1} * MV_o' \text{ matrix} \quad \text{<Equation>}$$

($M_o'$ matrix: current model matrix of target marker, $MV_o'$ matrix: current model view matrix of target marker, $MV_b'$ matrix: current model view matrix of base marker, $M_b$ matrix: model matrix of base marker)

The method for providing virtual contents in a virtual space based on a common coordinate system further includes: a step of determining whether a command for changing a position and an orientation of the virtual operation object is received from a remote device of a remote operator; and a step of mirroring changes in the position and the orientation of the virtual operation object on the virtual operation space according to a received command when a command for changing the position and the orientation of the virtual operation object is received.

The method for providing virtual contents in a virtual space based on a common coordinate system further includes: a step of updating the position and the orientation of the virtual operation object on the virtual operation space according to the calculated current model matrix of the target marker.

A device according to another aspect of the present invention includes: a marker detection unit that detects a base marker, which is a marker for identifying a fixed point of an actual operation space, and a target marker, which is a marker for identifying an actual operation object, from initial image data indicating an initial state of the actual operation object in the actual operation space; and a matrix calculation unit which calculates an initial model matrix of a target marker expressing an initial position and orientation of the target marker, and a model matrix of the base marker expressing a position and an orientation of the detected base marker in a virtual cooperative space having a common coordinate system which uses the detected base marker as a reference, and calculates a current model matrix of the target marker expressing a current position and orientation of the target marker by using the calculated model matrix of the base marker.

Advantageous Effects

The field device of the field operator designates the fixed point of the actual operation space as the base marker, and determines the position and the orientation of the virtual operation object corresponding to the actual operation object on the virtual operation space which uses the fixed base marker as a reference. That is, the method for providing virtual contents according to the present invention detects a change in an actual operation object using as a reference the base marker, which is attached to the fixed point in the actual operation space, and mirrors the change in the virtual operation space. By calculating the change in the position and the orientation of the actual operation object using as a reference the fixed base marker, and mirroring the change in the virtual operation object on the virtual operation space, the user device can generate a virtual operation space having constant coordinate system and scale. In other words, it is possible to generate the virtual operation space having a common coordinate system for remote operators. Accordingly, accurate information on the change in the position and the orientation of the actual operation object can be provided to the remote operators located in different spaces.

The method for providing virtual contents according to embodiments of the present invention grasps the movement of the actual operation object and the movement of the camera module using as a reference the fixed base marker, so that the user device can distinguish the movement of the actual operation object from the movement of the camera module. By calculating the model matrix of the target marker and the view matrix of the camera module using as a reference the base marker, the user device can distinguish and mirror the movement of the actual operation object and the movement of the camera module to the virtual operation space. Accordingly, the user device according to the embodiments of the present invention can prevent a problem that the camera movement is erroneously mirrored on the virtual cooperative space as the movement of the actual operation object.

As described above, the method for providing virtual contents according to embodiments of the present invention generates a virtual operation space having a common coordinate system and scale, and provides the generated virtual operation space to a plurality of operation participants, thereby enabling a smooth and accurate virtual operation among the operation participants. In addition, the virtual operation space based on the common coordinate system can be displayed in various extended reality such as virtual reality, augmented reality, or mixed reality because the coordinate system is constant.

BRIEF DESCRIPTION OF THE DRAWINGS

FIG. 6 is a view showing an example screen displayed on a display unit of the field device before and after a virtual operation object is moved.

FIG. 9 is a view showing an example screen displayed on the display units of the field device and the remote device before and after the actual operation object is moved.

FIG. 10 is a view showing an example screen in which a virtual operation space is displayed on the display units of the field device and the remote device according to the present embodiment.

BEST MODE FOR INVENTION

Hereinafter, embodiments of the present invention will be described in detail with reference to the drawings. The embodiments of the present invention to be described below relate to a method for providing virtual contents in a virtual space based on a common coordinate system. More specifically, the embodiments relate to a method for providing virtual contents between a field operator and a remote operator by using a virtual space based on a common coordinate system. For those of ordinary skill in the art to which the embodiments of the present invention pertain, it can be understood that "mixed reality (MR)" to be described below means technology that generates a new environment in which reality and virtual reality are combined, and thereby real physical and virtual objects coexist, and allows a user to interact with the environment in real time.

According to the following embodiments, the devices of the operation participants located in remote places are connected to each other through a communication network, so that the operation participants share an operation progress situation through augmented reality (AR) contents or virtual reality (VR) contents to be described below. Hereinafter, a virtual object corresponding to an actual operation object will be referred to as a "virtual operation object", and a virtual space corresponding to the actual operation space will be referred to as a "virtual operation space". At least one participant who is located in the actual operation space and performs an operation on the actual operation object will be referred to as a "field operator", and at least one participant who is located at a remote position from the actual operation space and participates in the operation on the actual operation object will be referred to as a "remote operator". In addition, a coordinate system of the virtual space that can be shared by the device of the field operator and the device of the remote operator and can be expressed in the augmented reality or the virtual reality will be referred to as a "common coordinate system". Here, the virtual space may be provided to the user in the virtual reality or the augmented reality depending on the device.

Figure 1:
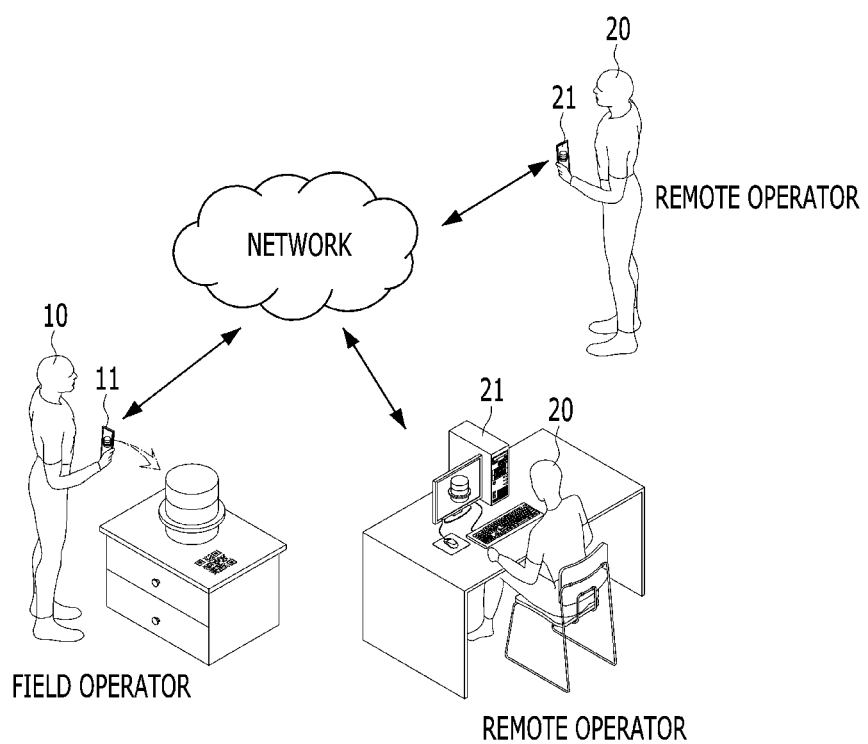
FIG. 1 is a configuration diagram of a virtual operation system according to an embodiment of the present invention.

FIG. 1 is a configuration diagram of a virtual operation system 1 according to an embodiment of the present invention. Referring to FIG. 1, the virtual operation system 1 according to the present embodiment includes a device 11 of a field operator 10 and a device 21 of a remote operator 20. The device 11 of the field operator 10 and the device 21 of the remote operator 20 may be the same device. Hereinafter, in order to distinguish the device 11 of the field operator 10 and the device 21 of the remote operator 20, the device 11 of the field operator 10 is referred to as the "field device 11", and the device 11 of the remote operator 20 will be referred to as the "remote device 21". The field device 11 and the remote device 21 are connected through a network 30 to communicate with each other. A plurality of operation participants 10 and 20 may perform an operation while sharing an operation situation in a mixed reality environment through contents displayed on the respective devices 11 and 21.

The field operator 10 located in the actual operation space performs a manipulation on an actual operation object through a collaboration with the remote operator 20, for example, a collaboration such as a repair operation of a faulty portion or a configuration element replacement operation, or an operation such as a game on the virtual space. More specifically, the field device 11 uses a camera module 112 thereof to photograph the actual operation object located in the actual operation space, that is, the operation field, generates a virtual operation object corresponding to the actual operation object photographed in this manner in the virtual operation space, and transmits data on the virtual operation object in the virtual operation space to the remote device 21 of the remote operator 20 located at a remote position.

The remote operator 20 may manipulate the virtual operation object using various input means while observing the virtual operation object in the virtual operation space displayed on the screen of the remote device 21. As the operation of the virtual operation object by the remote operator 20 is mirrored in the virtual operation space, information on the operation of the virtual operation object is transmitted to all field operators 10 and remote operators using the virtual operation application. The field operator 10 may immediately know the operation performed by the remote operator 20 in the virtual operation space based on a change in the virtual operation object in the virtual operation space. The field operator 10 may manipulate the actual operation object of the operation field with reference to the operation in the virtual operation space. As described above, the virtual operation technology shares the virtual operation object indicating the actual operation object between the remote operator 20, who is an expert remote from the operation field, and the field operator 10 located at the operation field, so that the field operator 10 may view the operation performed by the remote operator 20 in the virtual operation space and manipulate the actual operation object.

Like the field operator 10, the remote operator 20 may grasp the movement of the actual operation object manipulated by the field operator 10 while observing the virtual operation object in the virtual operation space displayed on the screen of the remote device 21. As the manipulation of the actual operation object by the field operator 10 is mirrored in the virtual operation space, information on the operation of the actual operation object is transmitted to all field operators 10 and remote operators 20 using the virtual operation application. The remote operator 20 may immediately know the operation performed by the field operator 10 in the actual operation space based on the change in the virtual operation object in the virtual operation space. The remote operator 20 may manipulate the virtual operation object of the virtual operation space with reference to the operation in the actual operation space. As described above, the virtual operation technology shares the virtual operation object indicating the actual operation object between the remote operator 20, who is an expert remote from the operation field, and the field operator 10 located at the actual operation field, thereby allowing the remote operator 20 to observe the operation performed by the field operator 10 in the actual operation space, in the virtual operation space, and manipulate the virtual operation object.

The field device 11 is a device for enabling the virtual operation for a plurality of operation participants 10 and 20 located at a distance from each other. The field device 11 executes a pre-installed virtual operation application performing remote cooperation service, and provides a remote cooperation service to the user through the virtual operation application. The virtual operation application is an application that connects the field devices 11 of a plurality of operation participants through a network to enable the virtual operation for the plurality of operation participants located at a distance from each other. Hereinafter, it is assumed that the virtual operation application is pre-installed on the field device 11 before performing the virtual operation. A representative example of the field device 11 includes a tablet PC, and may include a head mounted display (HMD), a virtual reality (VR) device, a smart phone, a tablet PC, a laptop, or the like. In addition, the field device 11 may be connected to another field device 11 by being connected to a wireless communication network such as WCDMA or LTE. As described above, the remote device 21 may be the same device as the field device 11.

Figure 2:
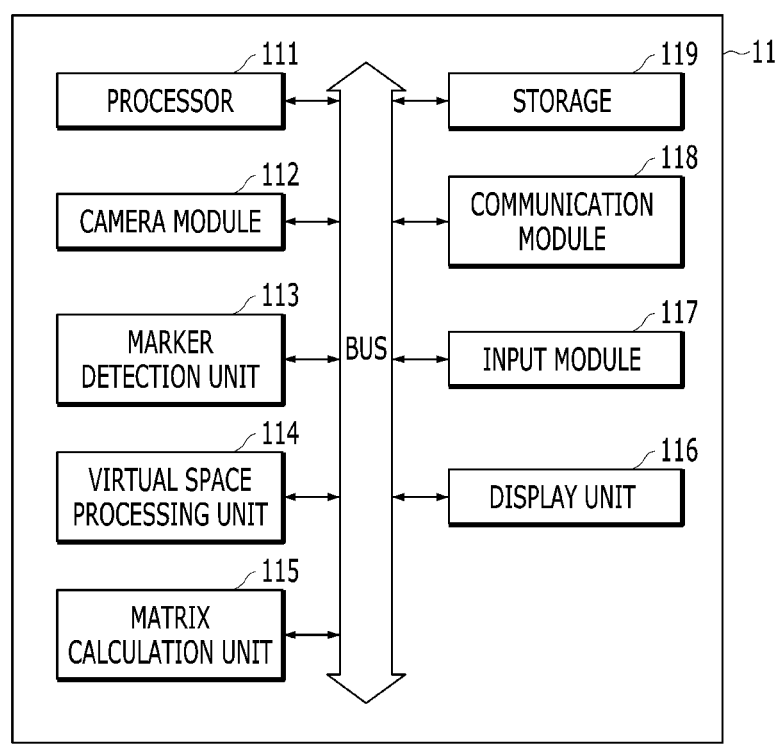
FIG. 2 is a block diagram of a field device shown in FIG. 1.

FIG. 2 is a configuration diagram of the field device 11 shown in FIG. 1. Referring to FIG. 2, the field device 11 includes a processor 111, the camera module 112, a marker detection unit 113, a virtual space processing unit 114, a matrix calculation unit 115, a display unit 116, an input module 117, a communication module 118, and a storage 119. The processor 111 processes a general task of the field device 11. The camera module 112 photographs the actual operation space in which the actual operation object is located, and generates image data indicating the actual operation object and the actual operation space. The marker detection unit 113 analyzes the image data generated from the camera module 112 to detect a base marker indicating a point serving as a reference point of the virtual operation space in the actual operation space in which the actual operation object is located and a target marker indicating the actual operation object in the virtual operation space. The virtual space processing unit 114 generates the virtual operation space that is a three-dimensional virtual space that mirrors a part or all of the actual operation space from the image data indicating the actual operation space. In addition, the virtual space processing unit 114 generates the virtual operation object having the same three-dimensional model shape as the actual operation object for the virtual operation of the field operator 10 and the remote operator 20, and disposes the generated virtual operation object in the operation space. The virtual space processing unit 114 detects a change in an actual manipulation object or a virtual manipulation object, and mirrors the detected change in the actual operation object or the virtual manipulation object in the virtual operation space.

The matrix calculation unit 115 calculates a matrix expressing a position and an orientation which are a state of an arbitrary object from the reference point in the virtual operation space. The matrix calculation unit 115 calculates a model matrix, a view matrix, and a model view matrix. Here, the matrix is a mathematical tool for classifying the positions and the orientations of virtual objects with reference to an arbitrary original point in the virtual space and calculating positions and orientations of the virtual objects independent of each other. The model matrix is a matrix expressing the state (position and orientation) of the virtual object in the virtual space. For example, the model matrix of the virtual operation object is a matrix expressing the position and the orientation of the virtual operation object with reference to the original point on the virtual operation space. The model matrix, the view matrix, and the model view matrix will be described in detail below. Here, the marker detection unit 113, the virtual space processing unit 114, and the matrix calculation unit 115 may be implemented as a dedicated processor different from the processor 111, and implemented by the processor 111 executing a computer program.

The display unit 116 displays the virtual operation space including the virtual manipulation object corresponding to the actual manipulation object. The input module 117 receives an input signal for manipulating the virtual operation object on the virtual operation space from the user. Examples of the input module 117 may include a keyboard, a mouse, a touch screen panel, a motion controller, and the like. The communication module 118 supports a communication function so as to communicate with another remote device 21 through a wide area network such as the Internet by connecting to an LTE base station or a Wi-Fi intermediary. The storage 119 stores an application for the virtual operation and data used by the application.

The field device 11 further includes additional configuration elements in addition to the configuration elements described above. For example, as shown in FIG. 2, the field device 11 includes a bus for transmitting data between various configuration elements, and includes a power module, which is not shown in FIG. 2, for supplying driving power to each configuration element. As described above, descriptions of configuration elements that are obvious to those of ordinary skill in the art to which the present embodiment pertains are omitted as they obscure the features of the present embodiment. Hereinafter, each configuration element of the field device 11 will be described in detail in the process of explaining a method for providing virtual contents in the virtual space based on the common coordinate system according to an embodiment of the present invention.

Figure 3:
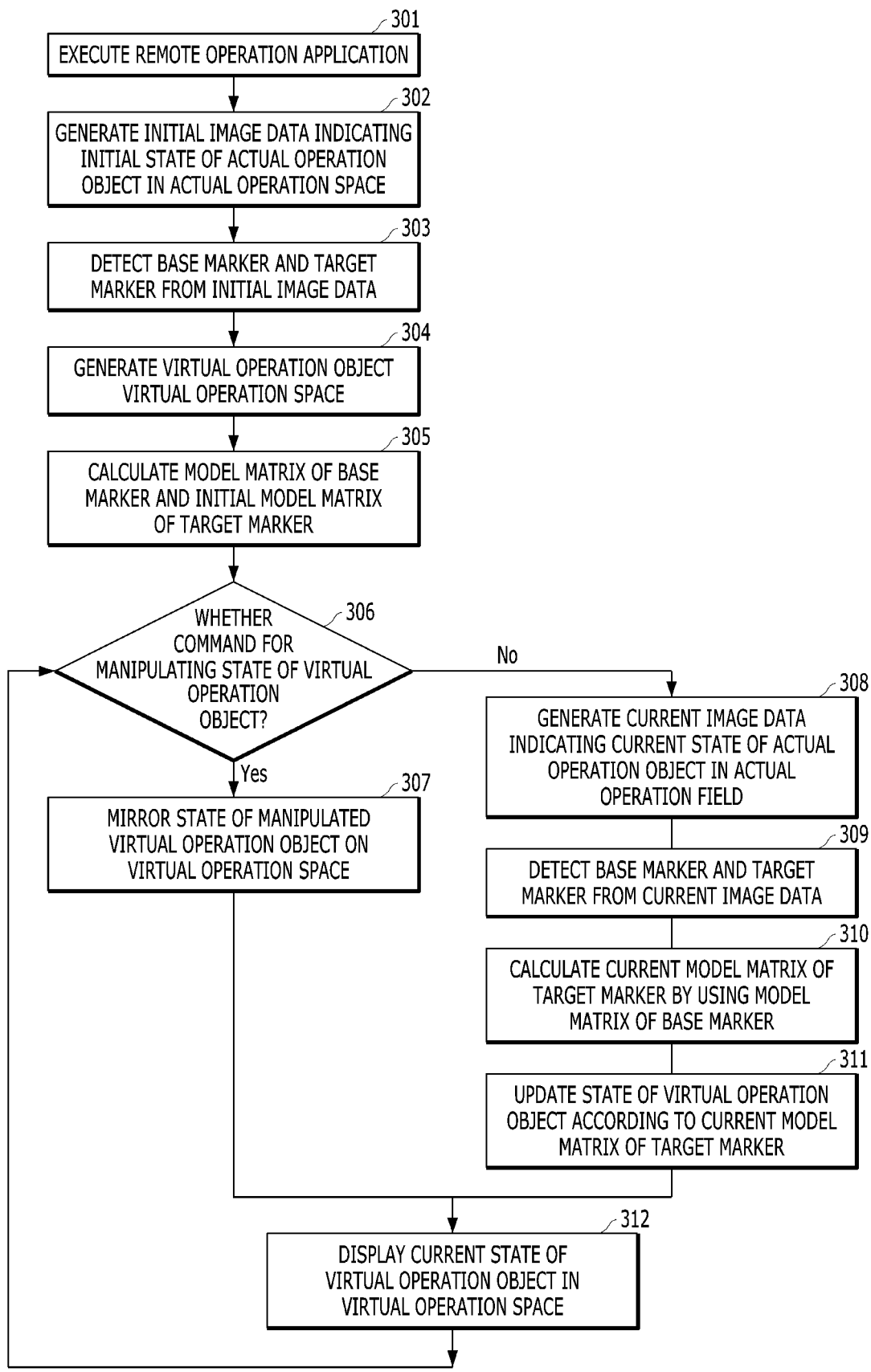
FIG. 3 is a flowchart of a method for providing virtual contents in a virtual space based on a common coordinate system between a field operator and a remote operator shown in FIG. 1.

FIG. 3 is a flowchart of a method for providing virtual contents in a virtual space based on a common coordinate system between the field operator and the remote operator shown in FIG. 1. Referring to FIG. 3, the method for providing virtual contents according to the present embodiment includes steps performed in time series in the field device 11 shown in FIG. 1.

In step 301, the processor 111 of the field device 11 executes the virtual operation application. More specifically, when the processor 111 receives an execution command of the virtual operation application from the field operator 10 through the input module 117, the processor 111 executes the virtual operation application. Referring to FIG. 1, the field device 11 of the field operator 10 executes the virtual operation application when receiving an execution command of the virtual operation application from the field operator 10. The remote device 21 of the remote operator 20 also executes the virtual operation application when receiving the execution command of the virtual operation application from the remote operator 20. The field device 11 of the field operator 10 and the remote device 21 of the remote operator 20 who have executed the virtual operation application are connected to each other through a network.

In step 302, the camera module 112 of the field device 11 generates initial image data indicating the initial state of the actual operation object in the actual operation space. Here, the image data is an electrical signal indicating characteristics of a two-dimensional or three-dimensional shape, and is data generated by an input device such as the camera module 112. The remote operator 20 uses the camera module 112 of the field device 11 to photograph the actual operation object that is an object of the virtual operation for virtual operation with at least one remote operator 20 that is far away therefrom. The camera module 112 generates the initial image data indicating the initial state of the actual manipulation object in the actual operation space. The initial image data indicates the initial state of the actual manipulation object including the position and the orientation of the actual operation object in the actual operation space before performing the virtual operation. Since the initial image data indicates the state of the actual operation object before performing the virtual operation, it becomes a reference for determining whether the state of the actual operation object is changed during the virtual operation. The camera module 112 inputs the generated initial image data to the marker detection unit 113 of the field device 11.

In step 303, the marker detection unit 113 of the field device 11 detects the base marker and the target marker from the initial image data input from the camera module 112. More specifically, the marker detection unit 113 detects the base marker for identifying the fixed point in the actual operation space and the target marker for identifying the actual operation object from the initial image data indicating the initial state of the actual operation object in the actual operation space. The marker detection unit 113 detects the base marker serving as a reference point in a virtual operation space coordinate system from the initial image data indicating the initial state of the actual operation object in the actual operation space, and detects the target marker indicating the actual operation object. As described above, the base marker is a marker serving as the reference point in the virtual operation space, and is a marker for identifying the fixed point in the actual operation space. Since the base marker serves as the reference point, the marker detection unit 113 detects the fixed point or an object as the base marker. The target marker is a marker for identifying an object that is the actual operation object of the virtual operation. The base marker and the target marker may be preset by the field operator 10. The detection of the base marker and the target marker will be described in detail below.

The marker detection unit 113 according to an embodiment of the present invention extracts a shape included in the image data through image processing, and detects the base marker and the target marker using the extracted shape. More specifically, the marker detection unit 113 extracts shapes included in the initial image data indicating the initial state of the actual operation object in the actual operation space. For example, the marker detection unit 113 extracts a feature point (key point) from the initial image data. The feature point is a point in an image that is easily identified while being distinguished from a surrounding background. The feature point is a point that can be easily identified even if a shape, a size, or a position of the object in the image data changes, and is a point that can be easily identified even if a viewpoint and lighting of the camera change. Examples of the feature point may include a corner, an edge, and the like. The marker detection unit 113 analyzes the extracted feature points to extract the shapes included in the image data. The marker detection unit 113 may extract the shapes included in the image data using an artificial neural network technique. Since the method for extracting the feature points and the shapes from image data is known to those of ordinary skill in the art to which this embodiment belongs, a detailed description thereof will be omitted in order to prevent blurring of the features of the present embodiment.

The marker detection unit 113 extracts the base marker and the target marker from among the shapes extracted from the initial image data. More specifically, the marker detection unit 113 compares the extracted shapes with the base marker shape and the target marker shape stored in advance in the storage 119. The marker detection unit 113 determines, as the base marker, a shape matching the shape of the base marker among the shapes extracted from the image data based on the comparison result, and determines, as the target marker, a shape matching the shape of the target marker. The marker detection unit 113 extracts, as the base marker, the same shape as the shape of the base marker stored in advance in the storage 119 of the field device 11, and extracts, as the target marker, the same shape as the shape of the target marker stored in advance in the storage 119.

The storage 119 of the field device 11 stores in advance the shape of the base marker and the shape of the target marker. As described above, the shape of the base marker is the shape of the point or the object that can serve as the reference point in the virtual operation space. Since the base marker serves as the reference point in the virtual operation space, the point or the object that can be designated as the base marker must be stationary and not moving. For example, a floor or a desk of the space in which the actual operation object is placed, a pattern of surrounding wallpaper, a Quick Response Code (QR code), a bar code, a specific pattern attached to the object fixed in the actual cooperative space, or the like can be the base marker. In a case where the QR code of the specific pattern is stored as the shape of the base marker, the field operator 10 may determine the base marker in advance in the actual operation space by attaching the QR code of the specific pattern to the fixed object in the actual operation space. The storage 119 of the field device 11 stores the image data indicating the shape of the base marker, which is the shape of the fixed point or the object in the actual operation space. The marker detection unit 113 compares the shape of the base marker stored in the storage 119 with the shapes extracted from the image data (that is, image data indicating the state of the actual operation object in the actual operation space) input by the camera module 117, and determines, as the base marker, a shape matching the shape of the stored base marker in advance.

In addition, as described above, the shape of the target marker is the shape of the actual operation object for which the field operator 10 and the remote operator 20 will operate together in the virtual operation space. The field operator 10 determines the actual operation object to perform the virtual operation with the remote operator 20 in the actual operation space. In one embodiment of the present invention, the field operator 10 generates the image data indicating the shape of the actual operation object determined by using the camera module 112 of the field device 11. The field device 11 stores in advance, in the storage 119, the image data indicating the shape of the target marker that is the shape of the actual operation object. The marker detection unit 113 compares the shape of the actual operation object stored in the storage 119 with the shapes extracted from the image data indicating the state of the actual operation object in the actual operation space, and determines, as the target marker (that is, the operation object in the virtual operation space), the shape matching the shape of the stored target marker in advance. For example, in a case where the actual operation object of the virtual operation is a powder container of a 3D printer, the storage 119 of the field device 11 stores in advance the shape of the powder container that is the actual operation object. The marker detection unit 113 of the field device 11 compares the shape extracted from the image data indicating the actual operation object in the actual operation space with the shape of the powder container stored in advance in the storage 119. As a result of comparison, a shape matching the shape of the powder container stored as the shape of the target marker in advance in the storage 119 is determined as the target marker. The marker detection unit 113 extracts the determined shape as the target marker.

In another embodiment of the present invention, the storage 119 of the field device 11 may store, as the shape of the target marker, an arbitrary code such as the QR code or, the bar code. The field operator 10 attaches the QR code or the bar code stored in the shape of the target marker to the actual operation object to perform the virtual operation, and may designate the actual operation object. For example, in a case where the actual operation object of the virtual cooperation is the powder container, the field operator 10 attaches the QR code stored in the storage 119 in the shape of the target marker to the powder container that is the actual operation object. The marker detection unit 113 compares the shape of the QR code or the bar code stored in the storage 119 with the shapes extracted from the image data indicating the actual operation object in the actual operation space, and can determine, as the target marker (that is, the operation object), the shape matching the shape of the QR code or the bar code stored in advance.

In another embodiment of the present invention, the target marker or the base marker includes an electrical signal that is invisible to the naked eye. For example, the field device 11 may recognize the target marker or the base marker through a signal transmitted by a small wireless communication device. For example, the wireless communication device, which transmits a beacon signal including information on the shape and the position of the base marker, is attached to a fixed point in the actual operation space, and the wireless communication device attached to the fixed point in the actual operation space transmits a signal for the base marker to the field device 11. The field device 11 may identify the shape and the position of the base marker based on the received signal for the base marker. The target marker and the wireless communication device that transmits the beacon signal including information on the shape and the position of the actual operation object are attached to the actual operation object. The wireless communication device attached to the actual operation object transmits a signal for the target marker to the field device 11. The field device 11 may identify the shape and the position of the target marker based on the received signal for the target marker. The field device 11 may identify the target marker and the base marker in various methods other than the above-described examples.

In step 304, the virtual space processing unit 114 of the field device 11 generates the virtual operation space for the virtual operation with the remote operator 20 and the virtual operation object corresponding to the actual operation object. The virtual space processing unit 114 generates the virtual operation space including the virtual operation object corresponding to the actual operation object of the virtual operation. The virtual operation space is a three-dimensional virtual space mirroring a part or all of the actual operation space from the image data indicating the state of the actual operation object in the actual operation space. For example, the virtual operation space is a three-dimensional space and may have an original point and X, Y, and Z axes. The virtual space processing unit 114 generates the virtual operation object having a three-dimensional model shape of the actual operation object. For example, in a case where the actual operation object is a cylindrical powder container, the virtual space processing unit 114 generates the virtual operation object having a cylindrical shape. The virtual space processing unit 114 disposes the virtual operation object, which is the three-dimensional model shape of the actual operation object, at an arbitrary position in the three-dimensional virtual operation space. Here, the arbitrary position at which the virtual operation object, which is the three-dimensional model shape of the actual operation object, is disposed may be preset by a designer. As will be described below, in the embodiments according to the present invention, by determining the state (position and orientation) of the target marker in the virtual operation space using the base marker attached to the fixed point in the actual operation space, the virtual operation space configured of the coordinate system having a reference common with the actual operation space can be generated.

In step 305, the matrix calculation unit 115 of the field device 11 calculates the model matrix of the base marker and the initial model matrix of the target marker detected in step 303 from the initial image data generated in step 302. The model matrix expresses a position and an orientation of any point or object disposed on the virtual operation space. For example, the model matrix of the base marker expresses the position and the orientation of the base marker on the virtual operation space. The initial model matrix of the target marker is the model matrix of the target marker that is calculated first after the target marker is detected, and expresses the initial state (position or orientation) of the virtual operation object of the virtual operation in virtual operation space. Accordingly, the initial model matrix of the target marker is the reference for determining the change in the target marker in the virtual operation space. In a case where the state (position and orientation) of the actual operation object is changed, since the state of the target marker is changed, a difference occurs between the initial model matrix of the target marker and the current model matrix expressing the current state of the target marker.

More specifically, in a case where a change occurs in the position or the orientation of the actual operation object, the field device 11 calculates the model matrix of the target marker using the image data indicating the changed state of the actual operation object, and compares the model matrix with the initial model matrix. Therefore, it is possible to know the change in the position and/or the orientation of the target marker, that is, the actual operation object in the virtual operation space. The initial model matrix of the target marker is a reference for determining whether a change, such as the movement of the actual operation object, occurs in the virtual operation.

If the model matrix of the base marker and the initial model matrix of the target marker are calculated based on the camera module 112 of the field device 11, even if there is no change in the actual operation object, as the position of the field device 11 is changed, there is a problem in that the position or the orientation of the base marker and the target marker is changed in the virtual operation space, so that erroneous information on the actual operation object may be transmitted to the remote operator 20.

More specifically, for the virtual operation of the field operator 10 and the remote operator 20, the field device 11 of the field operator 10 generates the virtual operation space including the virtual operation object corresponding to the actual operation object. In order for the field device 11 to display the virtual operation space including the virtual manipulation object, it is necessary to know the position and the orientation in which the virtual operation object corresponding to the actual operation object is disposed in the virtual operation space. The virtual operation object is disposed in a predetermined position and orientation on the virtual operation space. The position and the orientation of the virtual operation object in the virtual operation space may be expressed through the model matrix. The model matrix of the virtual operation object expresses the position and the orientation of the virtual operation object on the virtual operation space.

In addition, in order for the field device 11 to dispose the virtual operation object corresponding to the actual operation object in the virtual operation space in the same state as the actual operation object, it is necessary to know the orientation in which the camera module 112 of the field device 11 photographing the actual operation object in the actual operation space views the actual operation object in the actual operation space. The view matrix of the camera module 112 expresses the orientation in which the camera module 112 views the virtual operation object corresponding to the actual operation object in the virtual operation space.

When the user looks at the actual operation object in the actual operation space, the object looks different depending on the orientation in which the actual operation object is viewed. Also in the virtual operation space, the virtual operation object looks different depending on the orientation in which the camera module 112 views the virtual operation object. The model view matrix expresses the state (position and orientation) of the virtual manipulation object on the virtual operation space based on the camera module 112 of the field device 11. In other words, the model view matrix of the virtual operation object is a matrix expressing the position and the orientation of the virtual operation object based on the view of the camera module 117 used to photograph the image data. The model view matrix of the virtual operation object may be expressed as a product of the model matrix expressing the position and the orientation of the virtual operation object in the virtual operation space and the view matrix expressing the orientation in which the camera module 112 views the manipulation object. The model view matrix, the model matrix, and the view matrix may be expressed by the following equation.

$$\text{Model View matrix} = \text{View Matrix} * \text{Model matrix} \quad \text{[Equation 1]}$$

As described above, the model view matrix of the virtual operation object expresses the position and the orientation of the virtual operation object on the virtual operation space according to the viewing orientation of the camera module 112. The model view matrix of the virtual operation object may be calculated by the matrix calculation unit 115 of the field device 11 from the image data indicating the actual operation object in the actual operation space. Since the calculated model view matrix of the virtual operation object is based on the camera module 112, the model view matrix expresses relative position and orientation of the virtual operation object with respect to the position and the photographing orientation of the camera module 112.

The model view matrix of the virtual operation object can be calculated in the above-described manner, but it is not possible to know the model matrix of the virtual operation object expressing the absolute position and orientation of the virtual operation object on the virtual operation space, and the view matrix of the camera module 112 expressing the orientation in which the camera module 112 on the virtual operation space views the virtual operation object. As described above, since the model view matrix of the virtual operation object is the relative position and orientation of the virtual operation object according to the position and the orientation of the camera module 112, when the movement between the camera module 112 and the actual operation object occurs, it is not known whether this movement is due to the movement of the camera module 112 or the movement of the actual operation object. Due to such indeterminacy, the remote operator 20 in the virtual operation cannot know accurate information on the actual operation object.

Figure 4:
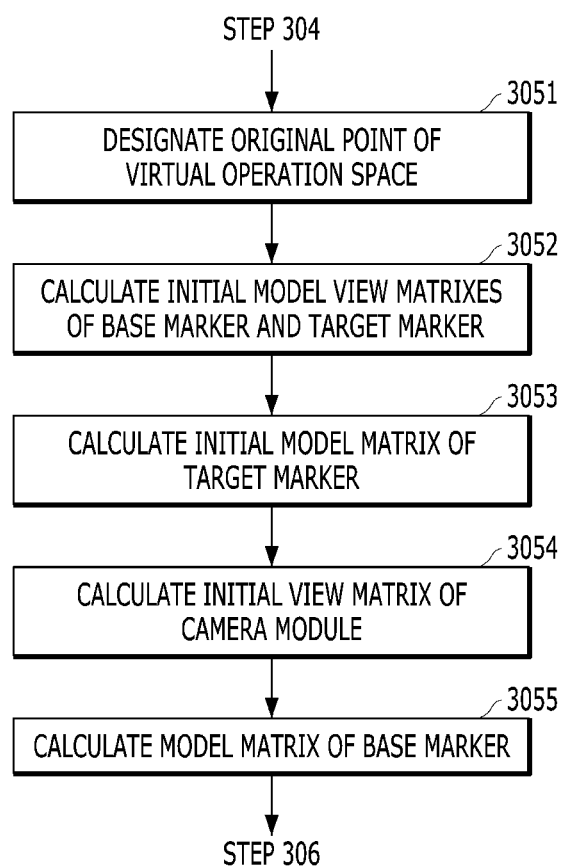
FIG. 4 is a detailed flowchart of a step of calculating initial model matrixes of a base marker and a target marker shown in FIG. 3.
Figure 5:
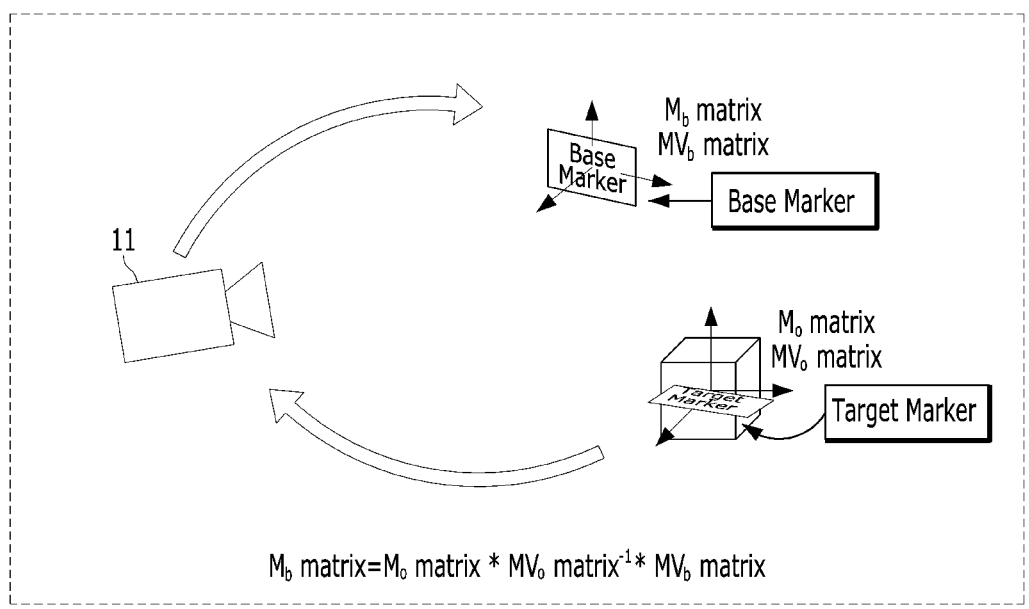
FIG. 5 is a view for explaining a method for calculating the initial model matrixes of the base marker and the initial model matrix of the target marker.

In order to solve such a problem, the embodiments of the present invention calculate the model matrix of the base marker and the initial model matrix of the target marker in the following manner. FIG. 4 is a detailed flowchart of the steps of calculating the model matrix of the base marker and the initial model matrix of the target marker shown in FIG. 3, and FIG. 5 is a view for explaining a method for calculating the model matrix of the base marker and the initial model matrix of the target marker. Referring to FIGS. 4 and 5, in step 3051, the virtual space processing unit 114 designates the original point in the virtual operation space generated in step 304. The virtual space processing unit 114 designates an arbitrary point in the generated virtual operation space as the original point.

In step 3052, the matrix calculation unit 115 calculates an initial model view matrix $MV_b$ matrix of the base marker and an initial model view matrix $MV_o$ matrix of the target marker based on the initial image data indicating the initial state of the actual operation object in the actual operation space. As described above, the model view matrix expresses the position and the orientation of the object on the virtual operation space based on the camera module 112. The matrix calculation unit 115 uses an algorithm for analyzing the image data to calculate the initial model view matrix $MV_b$ matrix of the base marker and the target marker and the initial model view matrix $MV_o$ matrix of the target marker according to the orientation in which the camera module 112 views each of the base marker and the target marker.

In step 3053, the matrix calculation unit 115 calculates the initial model matrix $M_o$ matrix of the target marker on the virtual operation space. As described above, it is assumed that the target marker is a marker for identifying the actual operation object, and is disposed at an arbitrary position on the virtual operation space mirroring the actual operation space. The matrix calculation unit 115 calculates the initial model matrix $M_o$ matrix of the target marker disposed at arbitrary position from the original point determined in step 3051.

In step 3054, the matrix calculation unit 115 uses the initial model view matrix $MV_o$ matrix of the target marker calculated in step 3052 and the initial model matrix $M_o$ matrix of the target marker calculated in step 3053 to calculate the initial view matrix View matrix of the camera module 112. As previously described in [Equation 1], the model view matrix is the product of the view matrix and the model matrix. According to [Equation 1], the initial model view matrix $MV_o$ matrix of the target marker can be expressed as a product of the initial model matrix $M_o$ matrix expressing the position and the orientation of the target marker in the virtual operation space and the initial view matrix View matrix expressing the orientation in which the camera module 112 views the virtual operation object. Since the model matrix is invertible, when both sides of [Equation 1] are multiplied by an inverse matrix of the model matrix, it is summarized as the following equation.

$$\text{View matrix} = MV_o \text{ matrix} * (M_o \text{ matrix})^{-1} \qquad \text{[Equation 2]}$$

The matrix calculation unit 115 can calculate the initial view matrix View matrix of the camera module 112 using Equation 2 above.

In step 3055, the matrix calculation unit 115 uses the initial view matrix View matrix of the camera module 112 calculated in step 3054 and the initial model view matrix $MV_b$ matrix of the base marker calculated in step 3052 to calculate the model matrix $M_b$ matrix of the base marker. As described above, the initial model view matrix $MV_b$ matrix of the base marker can be expressed as the product of the model matrix $M_b$ matrix that expresses the position and the orientation of the base marker in the virtual operation space, and initial view matrix View matrix that expresses the orientation in which the camera module 112 views the virtual operation object. Therefore, the model matrix $M_b$ matrix of the base marker can be expressed as follows.

$$M_b \text{ matrix} = (\text{View matrix})^{-1} * MV_b \text{ matrix} \qquad \text{[Equation 3]}$$

Equations 2 and 3 can be summarized as follows.

$$\begin{aligned} M_b \text{ matrix} &= (\text{View matrix})^{-1} * MV_b \text{ matrix} \qquad \text{[Equation 4]} \\ &= (MV_o \text{ matrix} * (M_o \text{ matrix})^{-1})^{-1} * MV_b \text{ matrix} \\ &= M_o \text{ matrix} * (MV_o \text{ matrix})^{-1} * MV_b \text{ matrix} \end{aligned}$$

The matrix calculation unit 115 calculates a model matrix $M_b$ matrix of the base marker through Equation (4). As described above, the base marker is a marker serving as the reference point in the virtual operation space, and since it corresponds to the fixed point or the object in the actual operation field, the base marker does not move. Accordingly, the model matrix $M_b$ matrix of the base marker is fixed.

The matrix calculation unit 115 of the field device 11 can calculate the model matrix of the base marker and the initial model matrix of the target marker in the virtual operation space having the common coordinate system based on the base marker using the above-described equations.

In step 306, the processor 111 of the field device 11 determines whether a command for changing at least one of the position and the orientation of the virtual operation object in the virtual operation space is received from the remote device 21 of the remote operator 20 through the communication module 118. The remote operator 20 may manipulate the position and the orientation of the virtual operation object on the virtual operation space through the virtual operation application running on the remote device 21. In a case where a command for changing at least one of the position and orientation of the virtual operation object in the virtual operation space is received by the remote operator 20 through the communication module 118 of the field device 11, the process proceeds to step 307, otherwise proceeds to step 308.

In step 307, in a case where the virtual space processing unit 114 of the field device 11 receives the command for changing at least one of the position and the orientation of the virtual operation object from the remote device 21 of the remote operator 20, the changes in the position and the orientation of the virtual operation object are mirrored in the virtual operation space according to the received command. In a case where a change occurs in the virtual operation object by the remote operator 20, the virtual space processing unit 114 of the field device 11 mirrors the generated change in the virtual operation object on the virtual operation space. More specifically, in a case where the remote operator 20 inputs a command for moving or rotating the position of the virtual operation object in the virtual operation space to the remote device 21, the remote device 21 transmits the command for the change in the virtual operation object to the field device 11 through the communication module. The field device 11 that has received such a command moves or rotates the position of the virtual operation object in the virtual operation space according to the received command, so that the manipulation of the virtual operation object by the remote operator 20 is mirrored in the virtual operation space. For example, in a case where the remote operator 20 inputs the command for moving the virtual operation object to the remote device 21, the field device 11 of the field operator 10 receives the command for moving the virtual operation object from the remote device 21 of the remote operator 20. The field device 11 of the field operator moves the virtual operation object on the virtual operation space according to the received command.

In this regard, FIG. 6 is a view showing an example screen displayed on the display unit of the user device before and after the virtual operation object is moved. Referring to FIG. 6, (a) of FIG. 6 is an example showing a screen in which the powder container that is the actual operation object and the virtual operation object of the powder container are displayed on the display unit 116 of the field device 11. Referring to the example of (a) of FIG. 6, the field device 11 photographs the powder container that is the actual operation object and the actual operation space in which the powder container is located, and the field device 11 displays the photographed powder container and actual operation space through the display unit 116. On the screen displayed in the display unit 116, the powder container that is the actual operation object, and the cylindrical virtual operation object having the same shape as the powder container are disposed in the same position and orientation. In other words, the actual powder container and the cylindrical virtual operation object are displayed in the display unit 116 by being overlapped.

Here, in a case where the remote operator 20 inputs a command for moving the cylindrical virtual operation object upward on the virtual operation space through the remote device 21, the cylindrical virtual operation object corresponding to the powder container moves upward on the virtual operation space. (b) of FIG. 6 is an example showing a screen displayed on the display unit 116 of the field device 11 of the field operator 10 in a case where the virtual operation object of the powder container is moved upward by the remote operator 20. Referring to (b) of FIG. 6, the field device 11 photographs the actual operation object and the actual operation space, and the display unit 116 of the field device 11 displays the powder container that is the actual operation object and the cylindrical virtual operation object corresponding to the powder container. As described above, in an example in which the command for moving the cylindrical virtual operation object corresponding to the powder container upward on the virtual operation space by the remote operator 20 is input, the virtual operation object displayed by the display unit 116 of the field device 11 moves upward. The field operator 10 can see the cylindrical virtual operation object separated upward, and can move the powder container, which is the actual operation object, upward. The field operator 10 may lift and remove the powder container from the actual operation space according to the manipulation on the virtual operation space of the remote operator 20. In the above-described manner, the field operator 10 and the remote operator 20 can perform collaboration through the virtual operation space.

In step 308, in a case where the field device 11 receives no command for changing at least one of the position and the orientation of the virtual operation object from the remote device 21 of the remote operator 20, the camera module 112 of the field device 11 generates current image data indicating the current state of the operation object and the operation field. Since the position and the orientation of the actual operation object continues to change while the virtual operation of the field operator 10 and the remote operator 20 is in progress, the field operator 10 uses the camera module 112 of the field device 11 for the virtual operation with the remote operator 20 to continuously photograph the changed actual operation object. The camera module 112 generates the current image data indicating the current state of the actual operation object in the actual operation space.

In step 309, the marker detection unit 113 of the field device 11 detects the base marker and the target marker from the current image data input from the camera module 112. A detailed description of a method for detecting the base marker and the target marker will be replaced with the description in step 303.

In step 310, the matrix calculation unit 115 of the field device 11 calculates the current model matrix of the target marker detected in step 309. The matrix calculation unit 115 calculates the current model matrix expressing the current state (position and orientation) of the target marker. In a case where the state (position and orientation) of the operation object is changed, the model matrix expressing the state (position and orientation) of the target marker corresponding to the operation object is variable.

Figure 7:
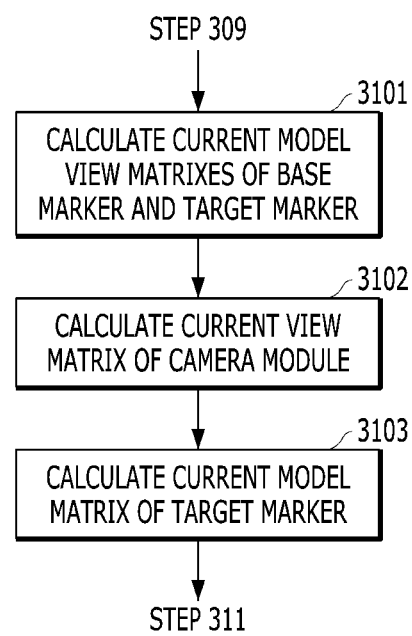
FIG. 7 is a detailed flowchart of a step of calculating a current model matrix of the target marker shown in FIG. 3.
Figure 8:
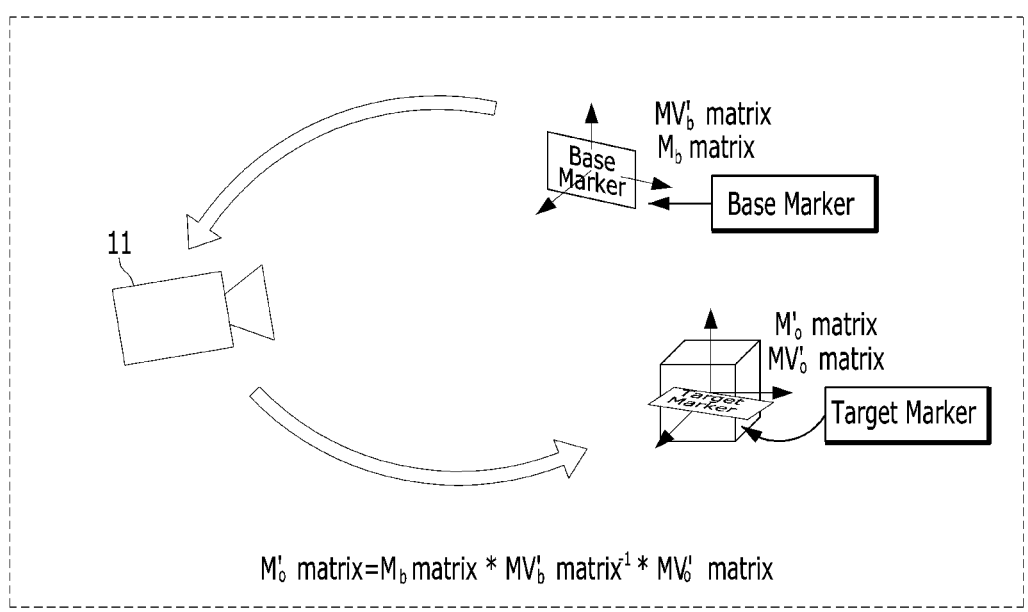
FIG. 8 is a view for explaining a method for calculating the current model matrix of the target marker.

In this regard, FIG. 7 is a detailed flowchart of the step of calculating the current model matrix of the target marker shown in FIG. 3, and FIG. 8 is a view for explaining a method for calculating the current model matrix of the target marker. Referring to FIGS. 7 and 8, as described above, the model view matrix is expressed as the product of the model matrix and the view matrix. In step 3101, the matrix calculation unit 115 calculates a current model view matrix $MV_b{}'$ matrix of the base marker and a current model view matrix $MV_o{}'$ matrix of the target marker from the current image data indicating the current state of the actual operation object in the actual operation space. A detailed description of the method for calculating the model view matrix will be replaced with the description in step 3052.

In step 3102, the matrix calculation unit 115 calculates a current view matrix View' matrix of the camera module 112 using the model matrix $M_b$ matrix of the base marker calculated in step 3055. As described above, the current model view matrix $MV_b{}'$ matrix of the base marker can be expressed as a product of the model matrix $M_b$ matrix that expresses the position and the orientation of the base marker in the virtual operation space, and the current view matrix View' matrix that expresses the orientation in which the camera module 112 views the operation object. Here, since the base marker is a fixed marker and there is no change in state, the model matrix of the base marker is constant. Accordingly, the current view matrix View' matrix of the camera module 112 may be expressed as follows.

$$\text{View' matrix} = MV_b'\text{ matrix} * (M_b\text{ matrix})^{-1} \qquad \text{[Equation 5]}$$

The matrix calculation unit 115 calculates the current view matrix View' matrix of the camera module 112 through Equation 5 above.

In step 3103, the matrix calculation unit 115 uses the current view matrix View' matrix of the camera module 112 calculated in step 3102 and the current model view matrix $MV_o{}'$ matrix of the target marker calculated in step 3101 to calculate the current model matrix $M_o{}'$ matrix of the target marker. As described above, the current model view matrix $MV_o{}'$ matrix of the target marker can be expressed as a product of the current model matrix $M_o{}'$ matrix that expresses the current position and orientation of the target marker in the virtual operation space, and the current view matrix View' matrix that expresses the orientation in which the camera module 112 views the current operation object. Accordingly, the current model matrix $M_o{}'$ matrix of the target marker may be expressed as follows.

$$M_o'\text{ matrix} = (\text{View' matrix})^{-1} * MV_o'\text{ matrix} \qquad \text{[Equation 6]}$$

Equations 5 and 6 can be summarized as follows.

$$\begin{aligned}M_o'\text{ matrix} &= (MV_b'\text{ matrix} * (M_b\text{ matrix})^{-1})^{-1} * MV_o'\text{ matrix} \\ &= M_b\text{ matrix} * (MV_b'\text{ matrix})^{-1} * MV_o'\text{ matrix}\end{aligned} \qquad \text{[Equation 7]}$$

The matrix calculation unit 115 calculates the current model matrix $M_o{}'$ matrix that expresses the current position and orientation of the target marker through Equation 7.

In step 311, the virtual space processing unit 114 of the field device 11 updates the state of the virtual operation object in the virtual operation space according to the current model matrix $M_o{}'$ matrix of the target marker calculated in step 310. As described above, the target marker indicates the operation object. The current model matrix $M_o{}'$ matrix of the target marker expresses the current position and orientation of the operation object in the virtual operation space. In a case where the current model matrix $M_o{}'$ matrix of the target marker is not the same as the initial model matrix $M_o$ matrix of the target marker, it can be considered that the actual operation object has moved. The change in the position or the orientation of the actual operation object is indicated in the current model matrix $M_o'$ matrix of the target marker calculated in step 310. Accordingly, in order to mirror the change in the actual operation object in the virtual operation space, the virtual space processing unit 114 can update the state of the virtual operation object in the virtual operation space in a manner of re-disposing the virtual operation object in the virtual operation space in the position and the orientation, according to the current model matrix $M_o'$ matrix of the target marker in the virtual operation space. In this manner, the field device 11 can mirror the change in the actual operation object in the actual operation space to the virtual operation space in real time. In a case where the state of the actual operation object changes, the virtual space processing unit 114 of the field device 11 manipulates the virtual operation object according to the current model matrix of the target marker to mirror the change in the state of the actual operation object to the virtual operation space.

In this regard, FIG. 9 is a view showing an example screen displayed on the display unit of the field device and the remote device before and after the actual operation object is moved. Referring to FIG. 9, (a) of FIG. 9 shows a screen in which the powder container that is the actual operation object and the virtual operation object of the powder container are displayed on the display unit 116 of the field device 11, and a screen in which the virtual operation object of the virtual operation space is displayed on the display unit of the remote device 21. Referring to (a) of FIG. 9, the field device 11 photographs the powder container that is the actual operation object and the actual operation space in which the powder container is located through the camera module. The field device 11 displays the photographed powder container and the actual operation space through the display unit 116. On the screen displayed in the display unit 116, the powder container that is the actual operation object and the cylindrical virtual operation object having the same shape as the powder container are disposed in the same position and orientation. In other words, the actual powder container and the cylindrical virtual operation object are displayed on the display unit 116 to be overlapped. In addition, on the screen displayed in the display unit of the remote device 21, the virtual operation object is disposed at an arbitrary position in the virtual operation space.

Here, in a case where the field operator 10 moves the powder container, which is the actual operation object, in the actual operation space, the virtual operation object corresponding to the powder container is also moved as much as the movement of the powder container in the virtual operation space. (b) of FIG. 9 is an example showing screens displayed on the display units of the field device 11 of the field operator 10 and the remote device 21 of the remote operator 20 in a case where the powder container, which is the actual operation object, is moved by the field operator 10 from the actual operation space. Referring to (b) of FIG. 9, the field device 11 photographs the actual operation object, and the display units of the field device 11 and the remote device 21 display the powder container that is the actual operation object and the cylindrical virtual operation objects corresponding to the powder container. As described above, in the example in which the powder container, which is the actual operation object, is moved on the actual operation space by the field operator 10, the powder container that is the actual operation object and the cylindrical virtual operation object displayed by the display units of the field device 11 and the remote device 21 are all moved in the same orientation. The remote operator 20 can check the manipulation of the actual operation object by the field operator 10 through the change in the virtual operation object. As described above, since the manipulation of the actual operation object is directly mirrored on the virtual operation object on the virtual operation space, the remote operator 20 can accurately know the current state of the actual operation object in the actual operation space. Accordingly, precise collaboration between the field operator 10 and the remote operator 20 can be performed.

In step 312, the display unit 116 of the field device 11 displays the current state of the virtual operation object in the virtual operation space mirrored in step 307 or updated in step 310 to the field operator 10, and the communication module 118 transmits the current state of the virtual operation object in the virtual operation space mirrored in step 307 or updated in step 310 to the remote device 21, thereby transferring the virtual content to the field operator 10 and the remote operator 20 in the virtual space based on the common coordinate system. As described above, the change in the position and the orientation of the virtual operation object is mirrored on the virtual operation space according to the command input by the remote operator 20 through the remote device 21, or the state of the virtual operation object is updated by the field operator 10 on the virtual operation space according to the change in the position and the orientation of the actual operation object in the actual operation space. Therefore, the state of the virtual operation object in the virtual operation space is variable. The display unit 116 of the field device 11 displays the current state of the changed virtual operation object in the virtual operation space. The field operator 10 refers to the current state of the virtual operation object displayed on the display unit 116 of the field device 11 to perform an operation on the actual operation object, for example, a repair operation of a faulty portion or a replacement operation of components.

In addition, the field device 11 transmits data indicating the current state of the virtual operation object in the virtual operation space to the remote device 21 through the communication module 118. The remote device 21 displays the current state of the virtual operation object in the virtual operation space on the display unit of the remote device 21 according to the received data. The remote operator 20 may know the state of the actual operation object in the actual operation space through the current state of the virtual operation object displayed on the display unit of the remote device 21. The remote operator 20 may refer to the state of the actual operation object in the actual operation space, perform an operation on the virtual operation object in the virtual operation space, and provide operation information on the actual operation object to the field operator 10. As described above, in the embodiments of the present invention, the state of the virtual operation object, which is the virtual content in the virtual operation space based on the common coordinate system, is provided to the field operator 10 and the remote operator 20 through the field device 11 and the remote device 12.

In this regard, FIG. 10 is a view showing an example screen in which the virtual operation space is displayed on the display units of the field device and the remote device according to the present embodiment. (a) of FIG. 10 is a view showing a screen in which the virtual operation space is displayed on the field device 11 of the field operator 10, and (b) of FIG. 10 is a view showing a screen in which the virtual operation space is displayed on the remote device 21 of the remote operator 20. Referring to (a) of FIG. 10, in a case where the field device 11 is a device supporting augmented reality (AR), a screen indicating the virtual operation object corresponding to the actual operation object and the actual operation space in which the actual operation object is located is provided to the field operator 10. Here, the virtual operation object corresponding to the actual operation object is displayed to be overlapped at the same position as the actual operation object by being matched.

The remote device 21 may receive data on the virtual operation space and the virtual operation object from the field device 11 through the network 30, and use the received data indicates to provide the screen indicating the state of the virtual operation object in the virtual operation space to remote operator. Referring to (b) of FIG. 10, in a case where the remote device 21 is a device supporting virtual reality (VR), the screen indicating the virtual operation object and the virtual operation space is provided to the remote operator 20.

Here, the screen, on which the virtual operation object in the virtual operation space is displayed, is variable according to the virtual environment supported by the device. As in the example described above, in a case where the field device is a device supporting AR, the field device displays the screen of the augmented reality, and in a case where the remote device is a device supporting VR, the remote device displays the screen of the virtual reality. Conversely, in a case where the field device is a device supporting VR, the field device displays the screen of the virtual reality, and in a case where the remote device is a device supporting AR, the remote device displays the screen of the augmented reality.

Steps 306 to 312 are repeatedly performed while performing the virtual operation between the field operator 10 and the remote operator 20. According to the present embodiment, in a case where the remote operator 20 manipulates the virtual operation object through the remote device 21 during the virtual operation between the field operator 10 and the remote operator 20, by mirroring the manipulation of the virtual operation object in the virtual operation space, it is possible to provide the field operator 20 with information on the operation performed by the remote operator 20 on the virtual operation object. In addition, the field device 11 uses the camera module to photograph the actual operation object in the actual operation space in real time, and mirrors the operation performed by the field operator 10 on the actual operation object in the actual operation space to the virtual operation object of the virtual operation space. Therefore, it is possible to provide the remote operator 20 with information on the state of the actual operation object in real time.

According to the above-described embodiments of the present invention, the method for providing virtual contents in a virtual space based on a common coordinate system designates the fixed point of the actual operation space as the base marker, and calculates the model matrix of the target marker expressing the state (position and orientation) of target marker indicating the actual operation object based on the fixed base marker. In the embodiment of the present invention, since the position and the orientation of the actual operation object mirrored in the virtual operation space are determined based on the fixed point in the actual operation space, the coordinate system and the scale of the virtual operation space are fixed. Accordingly, the coordinate systems and the scales of all operation participants sharing the virtual operation space are unified. Since the coordinate system and the scale on the virtual operation space are fixed, it is possible to transmit accurate information on the actual operation object to remote operators participating in the virtual operation.

In addition, the method for providing the virtual contents in the virtual space based on the common coordinate system according to the embodiments of the present invention grasps the change in the state (position and orientation) of the actual operation object and the movement of the camera module based on the fixed base marker, so that the user device can distinguish the movement of the operation object and the movement of the camera module. By calculating the model matrix of the target marker and the view matrix of the camera module based on the base marker, the user device may discriminately mirror the movement of the operation object and the movement of the camera module to the virtual operation space. Accordingly, the user device according to the embodiments of the present invention can prevent a problem that the movement of the camera is incorrectly mirrored to the virtual operation space as the movement of the operation object. The user device according to the embodiments of the present invention can distinguish the movement of the operation object and the movement of the camera module to transmit accurate information on the operation object to the remote operators participating in the virtual operation.

Meanwhile, the above-described embodiments of the present invention can be created as a program that can be executed on a computer, and can be implemented in a general-purpose digital computer that operates the program using a computer-readable recording medium. In addition, the structure of the data used in the above-described embodiments of the present invention may be recorded in a computer-readable recording medium through various means. The computer-readable recording medium includes a storage medium such as a magnetic storage medium (for example, a ROM, a floppy disk, a hard disk, or the like) and an optically readable medium (for example, a CD-ROM, a DVD, or the like).

So far, the preferred embodiments of the present invention have been mainly described. Those of ordinary skill in the art to which the present invention pertains will understand that the present invention can be implemented in a modified form without departing from the essential characteristics of the present invention. Therefore, the disclosed embodiments are to be considered in an illustrative rather than a restrictive sense. The scope of the present invention is indicated in the claims rather than the above description, and all differences within the scope equivalent thereto should be construed as being included in the present invention.

The invention claimed is:

1. A method for providing virtual contents in a virtual space based on a common coordinate system, the method comprising:
   a step of detecting a base marker, which is a marker for identifying a fixed point of an actual operation space, and a target marker, which is a marker for identifying an actual operation object, from initial image data indicating an initial state of the actual operation object in the actual operation space;
   a step of calculating an initial model matrix of the target marker expressing an initial position and orientation of the target marker, and a model matrix of the base marker expressing a position and an orientation of the detected base marker in a virtual operation space having a common coordinate system which uses the detected base marker as a reference;
   a step of calculating a current model matrix of the target marker expressing a current position and orientation of the target marker by using the calculated model matrix of the base marker;

a step of generating a virtual operation object within the virtual operation space, the virtual operation object comprising a three-dimensional model shape of the actual operation object; and a step of mirroring changes in a position and an orientation of the actual operation object onto the virtual operation object, said step comprising:

detecting, via a camera module of a field device in the actual operation space, a difference between the current model matrix of the target marker and the initial model matrix of the target marker; and updating at least one of a position and an orientation of the virtual operation object according to the difference.

2. The method for providing virtual contents in a virtual space based on a common coordinate system according to claim 1, wherein in the step of detecting the target marker, a shape included in the initial image data is extracted, and the base marker and the target marker are detected by using the extracted shape.

3. The method for providing virtual contents in a virtual space based on a common coordinate system according to claim 2, wherein in the step of detecting the target marker, the extracted shape is compared with a shape of the base marker and a shape of the target marker, a shape matching the shape of the base marker is detected as the base marker, and a shape matching the shape of the target marker is detected as the target marker.

4. The method for providing virtual contents in a virtual space based on a common coordinate system according to claim 1, wherein the step of calculating the model matrix of the base marker includes:

a step of calculating an initial model view matrix of the base marker indicating the position and the orientation of the base marker using as a reference a view of a camera module used for photographing of the initial image data based on the initial image data, and an initial model view matrix of the target marker indicating the position and the orientation of the target marker using as a reference the view of the camera module;

a step of calculating the initial model matrix of the target marker on the virtual operation space; and a step of calculating a model matrix of the base marker by using the calculated initial model view matrix of the base marker, the calculated initial model matrix of the target marker, and the calculated initial model view matrix of the target marker.

5. The method for providing virtual contents in a virtual space based on a common coordinate system according to claim 4, wherein in the step of calculating the model matrix of the base marker by using the calculated initial model view matrix of the base marker, the calculated initial model matrix of the target marker, and the calculated initial model view matrix of the target marker, the model matrix of the base marker is calculated according to the following equation, $$M_b \text{ matrix} = M_o \text{ matrix} * (MV_o \text{ matrix})^{-1} * MV_b \text{ matrix} \quad \text{<Equation>}$$

($M_b$ matrix: model matrix of base marker, $MV_b$ matrix: initial model view matrix of base marker, $M_o$ matrix: initial model matrix of target marker, $MV_o$ matrix: initial model view matrix of target marker).

6. The method for providing virtual contents in a virtual space based on a common coordinate system according to claim 1, wherein the step of calculating the current model matrix of the target marker includes:

a step of calculating a current model view matrix of the base marker and a current model view matrix of the target marker based on the current image data; and a step of calculating a current model matrix of the target marker by using the calculated current model view matrix of the base marker, the calculated current model view matrix of the target marker, and the calculated model matrix of the base marker.

7. The method for providing virtual contents in a virtual space based on a common coordinate system according to claim 6, wherein in the step of calculating the current model matrix of the target marker by using the calculated current model view matrix of the base marker, the calculated current model view matrix of the target marker, and the calculated model matrix of the base marker, the current model matrix of the target marker is calculated according to the following equation, $$M_o'\text{matrix} = M_b \text{ matrix} * (MV_b'\text{matrix})^{-1} * MV_o'\text{matrix} \quad \text{<Equation>}$$

($M_o'$ matrix: current model matrix of target marker, $MV_o'$ matrix: current model view matrix of target marker, $MV_b'$ matrix: current model view matrix of base marker, $M_b$ matrix: model matrix of base marker).

8. The method for providing virtual contents in a virtual space based on a common coordinate system according to claim 1, further comprising:

a step of determining whether a command for changing a position and an orientation of the virtual operation object is received from a remote device of a remote operator; and a step of mirroring changes in the position and the orientation of the virtual operation object on the virtual operation space according to a received command when a command for changing the position and the orientation of the virtual operation object is received.

9. The method for providing virtual contents in a virtual space based on a common coordinate system according to claim 1, further comprising:

a step of updating the position and the orientation of the virtual operation object on the virtual operation space according to the calculated current model matrix of the target marker.

10. A computer-readable recording medium in which a program for executing the method according to claim 1 in a computer is recorded.

11. A device comprising:

a marker detection unit that detects a base marker, which is a marker for identifying a fixed point of an actual operation space, and a target marker, which is a marker for identifying an actual manipulation object, from initial image data indicating an initial state of the actual manipulation object in the actual operation space;

a matrix calculation unit which calculates an initial model matrix of the target marker expressing an initial position and orientation of the target marker, and a model matrix of the base marker expressing a position and an orientation of the detected base marker in a virtual operation space having a common coordinate system which uses the detected base marker as a reference, and calculates a current model matrix of the target marker expressing a current position and orientation of the target marker by using the calculated model matrix of the base marker; and a virtual space processing unit that generates a virtual operation object within the virtual operation space, the virtual operation object comprising a three-dimensional model shape of the actual operation object, and mirrors changes in a position and an orientation of the actual operation object onto the virtual operation object;

wherein the virtual space processing unit is configured to mirror changes in the position and the orientation of the actual operation object onto the virtual operation object by:

detecting, via a camera module of a field device in the actual operation space, a difference between the current model matrix of the target marker and the initial model matrix of the target marker; and updating at least one of a position and an orientation of the virtual operation object according to the difference.

* * * * *